United States Patent [19]

Aihara et al.

[11] Patent Number: 5,037,866

[45] Date of Patent: Aug. 6, 1991

[54] AIR-DRYING AQUEOUS COATING COMPOSITION FOR ELECTRO-DEPOSITION BASED ON FATTY ACID MODIFIED ACRYLIC COPOLYMERS

[75] Inventors: Tetsuo Aihara, Isehara; Yasuharu Nakayama, Fujisawa; Shigeki Matsubara; Kozo Sawada, both of Hiratsuka, all of Japan

[73] Assignee: Kansai Paint Co., Ltd., Hyogo, Japan

[21] Appl. No.: 581,991

[22] Filed: Sep. 10, 1990

Related U.S. Application Data

[63] Continuation of Ser. No. 436,105, Nov. 15, 1989, abandoned, which is a continuation of Ser. No. 98,931, Sep. 15, 1987, abandoned.

[51] Int. Cl.[5] .............................................. C08L 63/00
[52] U.S. Cl. ...................................... 523/410; 523/411; 523/412; 523/409; 525/111; 525/111.5
[58] Field of Search ................ 523/410, 409, 411, 412

[56] References Cited

U.S. PATENT DOCUMENTS

| | | | |
|---|---|---|---|
| 3,335,103 | 8/1967 | Huggard | 523/412 |
| 3,364,162 | 1/1968 | Huggard | 523/412 |
| 4,333,865 | 6/1982 | Zuckert | 523/412 |

FOREIGN PATENT DOCUMENTS

| | | |
|---|---|---|
| 92773 | 7/1980 | Japan . |
| 98266 | 7/1980 | Japan . |
| 59-122563 | 7/1984 | Japan . |
| 235466 | 10/1986 | Japan . |
| 10269 | 3/1987 | Japan . |

*Primary Examiner*—John Kight, III
*Assistant Examiner*—Frederick Krass
*Attorney, Agent, or Firm*—Wenderoth, Lind & Ponack

[57] ABSTRACT

An air-drying aqueous coating composition for electrodeposition comprising

[A] a water-solubilized product or a water-dispersed product obtained by reacting (A-1) an epoxy resin and (A-2) a (semi)drying oil fatty acid-modified vinyl polymer having an acid value of 10 to 200 in such proportions that the solids weight ratio of the component (A-1) to the component (A-2) is from 90/10 to 5/95, and

[B] an amphoteric organic solvent having affinity for component [A].

16 Claims, No Drawings

AIR-DRYING AQUEOUS COATING COMPOSITION FOR ELECTRO-DEPOSITION BASED ON FATTY ACID MODIFIED ACRYLIC COPOLYMERS

This application is a continuation of now abandoned application Ser. No. 436,105, filed Nov. 15, 1989 which application is, in turn, a continuation of now abandoned application Ser. No. 098,931, filed Sept. 15, 1987.

This invention relates to an electrodeposition coating aqueous composition which can be dried and cured at room temperature. More specifically, this invention relates to an air-drying coating composition for electrodeposition coating comprising a water-solubilized or water-dispersed product of the reaction product formed between an epoxy resin and a fatty acid-modified polymer as a main component.

The electrodeposition coating method is widely used in coating automobiles and other metallic products because of its many advantages. For example, as compared with other coating methods such as flow coating, brush coating, spray coating and dip coating, the electrodeposition coating method permits coating of articles having complex shapes in a uniform film thickness, and the loss of the coating composition is small so that the efficiency of its utilization is very high. Furthermore, tearing, sagging, stagnation, etc. do not easily occur in the coated surface. However, since heat-curing type aqueous paints used in almost all conventional electrodeposition coating processes require high temperatures of more than 100° C. for curing, such electrodeposition coating processes are difficult to apply to articles having a high heat capacity, or may suffer from economic losses.

The present inventors thought that if an aqueous paint which can be dried and cured at room temperature can be applied by electrodeposition coating without the need to bake the coated film at a high temperature and a practical film can be formed at room temperature, the aforesaid defects of the electrodeposition coating method would be able to be eliminated while retaining its advantages mentioned above. On the basis of this thought, the present inventors have made investigations on air-drying aqueous coating compositions suitable for electrodeposition coating.

Curability at room temperature alone is not sufficient as a characteristic which the aqueous coating composition for use in electrodeposition should have. It must have some rigorous requirements at the same time. For example, (1) its paint components should not be deteriorated, but have excellent stability, in an electrodeposition coating bath. (2) It should give a coated film having excellent smoothness at room temperature. (3) It should have good throwing power.

The present inventors tried to perform electrodeposition coating with emulsion-type and aqueous solution-type air drying aqueous coating compositions comprising alkyd resins or maleinized polybutadiene. It was found that the tested emulsion-type aqueous coating compositions did not give dense coated films having excellent smoothness and their throwing powers were not sufficient. The water-soluble alkyd resin coating compositions did not have a sufficient film hardness, and took a long period of time for film drying. In addition, the alkyd resin easily hydrolyzed in the electrodeposition coating bath, and the stability of the bath was poor. Hence, the coating compositions had poor throwing power and roughening occurred in the coated film surface. On the other hand, the water-soluble maleinized polybutadiene coating composition hardly hydrolyzed, but was not practical since it had poor drying property at room temperature.

Thus, air-drying aqueous coating compositions generally used heretofore lack one or more of bath stability, throwing power, film drying property and film smoothness which are among the properties required of the air drying aqueous coating composition for electrodeposition coating.

As an improvement over the aforesaid conventional air-drying aqueous coating compositions, the present inventors previously proposed an air-drying aqueous resin composition for electrodeposition comprising as a main component a water-solubilized or water-dispersed product of a fatty acid-modified carboxyl group-containing polymer which comprises (A) units of an ethylenically unsaturated monomer having a non-conjugated unsaturated fatty acid containing at least two non-conjugated double bonds bonded thereto as pendant side chains through an ester linkage and (B) units of an ethylenically unsaturated monomer having at least one carboxyl group and which has a glass transition temperature of $-10°$ to $60°$ C., a non-conjugated unsaturated fatty acid content of 4 to 47% by weight and an acid value of 5 to 260 (Japanese Laid-Open Patent Publication No. 122563/1984). This resin composition, however, gives a coated film having defective properties (particularly in regard to initial film hardness and antiblocking property) when the drying time after electrodeposition coating is short. Its storage stability, water resistance and alkali resistance are still insufficient. If the above copolymer is rendered water-dispersed by decreasing its acid value, it has excellent water resistance and alkali resistance. But, since the hydrophilicity and hydrophobicity of the dispersed particles cannot be properly balanced, the composition has poor storage stability and bath stability.

The present inventors have made extensive investigations in order to develop an improved air-drying aqueous coating composition for electrodeposition coating which is free from the above-described disadvantages. These investigations have now led to the discovery that an electrodeposition coating composition having good storage stability and good bath stability and which is capable of forming a coated film having excellent hardness, antiblocking property, water resistance and alkali resistance at room temperature can be obtained by using an aqueous composition of a product obtained by reacting an epoxy resin and a vinyl polymer modified with a particular proportion of a (semi)drying oil fatty acid.

Thus, according to this invention, there is provided an air-drying aqueous coating composition for electrodeposition comprising

[A] a water-solubilized product or a water-dispersed product obtained by reacting (A-1) an epoxy resin and (A-2) a (semi)drying oil fatty acid-modified vinyl polymer having an acid value of 10 to 200 in such proportions that the solids weight ratio of the component (A-1) to the component (A-2) is from 90/10 to 5/95, and

[B] an amphoteric organic solvent having affinity for component [A].

The term "(semi)drying oil fatty acid-modified vinyl polymer" denotes a semidrying oil fatty acid-modified vinyl polymer, a drying oil fatty acid-modified vinyl polymer, and a mixture of these.

Since the component [A] is an epoxy resin which is hard and hydrophobic and has excellent adhesion to a metal substrate, an electrodeposited film from the composition of this invention has excellent initial film hardness, adhesion, water resistance, alkali resistance and antiblocking property. Furthermore, since the epoxy resin is chemically bonded to the vinyl polymer as component (A-2), the component [A] is stable. In addition, since the epoxy resin component is not vulnerable to hydrolysis by water or a neutralizing agent, the resulting composition has excellent water dispersibility and storage stability, and is stable in an electrodeposition bath.

The epoxy resin (A-1) used in component [A] may be any of those known in the field of paints, and for example, has a number average molecular weight of at least about 350, preferably about 350 to about 10,000, more preferably 450 to 5,500, and an epoxy equivalent of about 140 to about 10,000, preferably about 180 to about 8,000, more preferably 230 to 5,000. Specifically, bisphenol A-epichlorohydrin type epoxy resins are preferred. Examples of commercially available epoxy resin include Epikote 828, Epikote 1001, Epikote 1002, Epikote 1003, Epikote 1004, Epikote 1007, Epikote 1009 and Epikote 1010 of Shell Chemical Co., and Araldite 6071, Araldite 6084, Araldite 6097, Araldite 6099 and Araldite 7004 of Ciba-Geigy Co. Epoxy resin obtained by modifying the foregoing resins with fatty acids and other monobasic acids such as benzoic acid, methylbenzoic acid and p-tert-butylbenzoic acid may also be used. From the standpoint of film hardness, epoxy resins which is solid at room temperature are preferred.

The above bisphenol A-epichlorohydrin type epoxy resins may be used in combination with other epoxy resins examples of which are given below.

(1) Phenol/novolak resin-epihalohydrin type epoxy resins; (2) polyhydric alcohol-glycidyl ether type epoxy resins obtained by etherification between glycidyl compounds and polyhydric alcohols such as ethylene glycol, diethylene glycol, triethylene glycol, 1,2-propylene glycol, 1,4-propylene glycol, 1,5-pentanediol, 1,2,6-hexanetriol, glycerol and bis(4-hydroxycyclohexyl)-2,2-propane; and (3) polycarboxylic acid glycidyl ester type epoxy resins derived from polycarboxylic acids such as succinic acid, glutaric acid, terephthalic acid, 2,6-naphthalenedicarboxylic acid and dimerized linolenic acid.

Examples of particularly preferably used epoxy resins in this invention are those of the bisphenol A-epichlorohydrin type represented by the following general formula:

There can also be used bisphenol F-epichlorohydrin type epoxy resins of the formula:

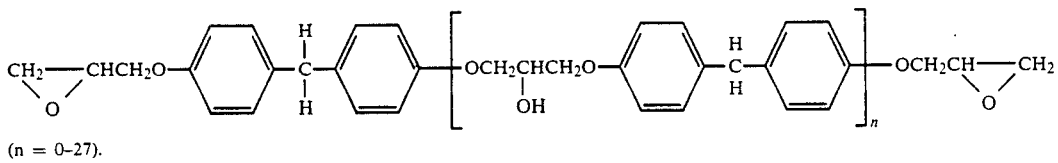

(n = 0–27).

The (semi)drying oil fatty acid-modified vinyl polymer (A-2) used in component [A] in this invention includes fatty acid-modified polymers of a structure in which a (semi)drying oil fatty acid residue is bonded as a pendant side chain via an ester linkage to a main chain composed of a vinyl polymer obtained by polymerizing at least one ethylenically unsaturated monomer. Preferred are those which have a glass transition temperature of generally −30° to 60° C., preferably −20° to 50° C., and an acid value of generally 10 to 200, preferably 20 to 180, and contain generally 5 to 60% by weight, preferably 10 to 50% by weight of the fatty acid residues.

Such a fatty acid-modified polymer may be obtained by copolymerizing (a-1) a (semi)drying oil fatty acid-modified unsaturated monomer, (a-2) an ethylenically unsaturated carboxylic acid and (a-3) an alpha,beta-ethylenically unsaturated monomer, or by first copolymerizing components (a-2) and (a-3), and reacting the resulting polymer with (a-4) a glycidyl ester of a (semi)drying oil fatty acid. The methods of production will be described below in detail.

(Semi)Drying Oil Fatty Acid-Modified Unsaturated Monomer (a-1)

Examples of the monomer (a-1) are given below.

(a) Monomers obtained by reacting oxirane group-containing unsaturated monomers such as glycidyl (meth)acrylate with (semi)drying oil fatty acids (see, for example, Japanese Patent Publication No. 37624/1979) corresponding to U.S. Pat. No. 3,988,273).

(b) Monomers obtained by reacting hydroxylethyl group-containing unsaturated monomers such as 2-hydroxy (meth)acrylate with (semi)drying oil fatty acids (see, for example, Japanese Patent Publication No. 10269/1987).

(c) Monomers obtained by addition of isocyanate compounds such as phenyl isocyanate to the secondary hydroxyl group of the monomers obtained in (a) (see, for example, Japanese Laid-Open Patent Publication No. 92773/1980).

(d) Monomers obtained by reacting the monomers obtained in (a) with organic acids, organic acid anhydrides (such as acetic anhydride) or organic acid chlorides (see, for example, Japanese Laid-Open Patent Publication No. 98266/1980).

(e) Monomers containing at least one urethane linkage (—NH—COO—), a non-conjugated double bond and one ethylenically unsaturated bond in the molecule,

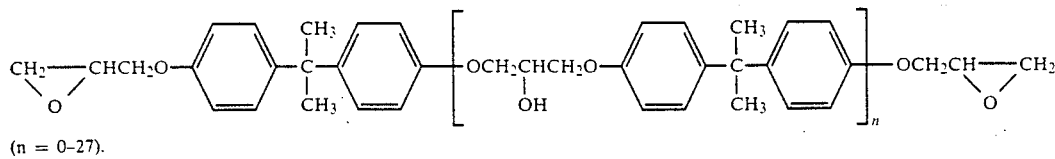

(n = 0–27).

such as monomers obtained by reacting unsaturated monomers containing an isocyanate group with fatty acids containing a hydroxyl group and a non-conjugated double bond, or monomers obtained by reacting hydroxyl group-containing acrylic monomers with fatty acids containing an isocyanate group and a non-conjugated double bond (see, for example, Japanese Laid-Open Patent Publication No. 235466/1986).

Since the monomers (a) and (b) are especially preferred among them, they will be described more specifically below.

Examples of the oxirane group-containing unsaturated monomers used for forming the monomers (a) are glycidyl esters of alpha,beta-ethylenically unsaturated acids such as glycidyl acrylate and glycidyl methacrylate.

The monomers (a) are prepared by reacting these unsaturated monomers with (semi)drying oil fatty acids.

Drying oil fatty acids cannot be strictly defined. Generally, however, the drying oil fatty acids denote unsaturated fatty acids having an iodine value of at least 130, and the semidrying fatty acids denote unsaturated fatty acids having an iodine value of 100 to 130. Typical examples of the (semi)drying oil fatty acids include safflower oil fatty acid, linseed oil fatty acid, soybean oil fatty acid, sesame oil fatty acid, poppy oil fatty acid, perilla oil fatty acid, hemp seed oil fatty acid, grape kernel oil fatty acid, corn oil fatty acid, tall oil fatty acid, sunflower oil fatty acid, cotton seed fatty acid, walnut oil fatty acid and rubberseed oil fatty acid. These fatty acids may be used singly or in combination.

The amount of the fatty acid used may be varied widely depending upon the drying property or coated film properties desired of the aqueous coating composition provided by this invention. Generally, it is advantageous to use the fatty acid in an amount of 5 to 65% by weight, preferably 10 to 60% by weight, based on the weight of the resulting copolymer (A-2).

The above (semi)drying fatty acid may be used in combination with a small amount (preferably not more than 30% by weight, preferably not more than 20% by weight, based on the total weight of the fatty acids) of another unsaturated fatty acid, for example a fatty acid containing a conjugated double bond such as tung oil fatty acid, oiticica oil fatty acid, dehydrated castor oil fatty acid and Hi-diene fatty acid (a tradename for a product of Soken Chemical Co., Ltd.; containing 40-50% of conjugated linolic acid).

The reaction of the oxirane group-containing unsaturated monomer with the (semi)drying oil fatty acid may be terminated usualy in 0.5 to 40 hours, preferably in 3 to 10 hours, at a temperature of generally 60° to 220° C., preferably 120° to 170° C. The suitable amount of the unsaturated monomer used at this time is 0.8 to 1.2 moles per mole of the aforesaid fatty acids.

The monomers (b) above are the reaction products between hydroxyl group-containing unsaturated monomers and (semi)drying oil fatty acids. The hydroxyl group-containing unsaturated monomers include those which have one hydroxyl group and 2 to 24 carbon atoms, preferably 2 to 8 carbon atoms, in the acrylate or methacrylate ester residue portion. Preferred are hydroxyl group-containing acrylic esters represented by the following formula (I) or (II)

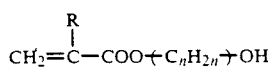

(I)

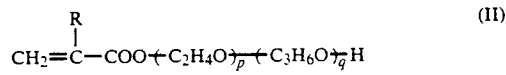

wherein R represents a hydrogen atom or a methyl group, n is an integer of 2 to 8, and p and q are integers of 0 to 8, with the proviso that the sum of p and q does not exceed 8.

Especially preferred hydroxyl group-containing acrylic esters in this invention are hydroxyalkyl acrylates and hydroxyalkyl methacrylates represented by formula (I) above, above all 2-hydroxyethyl acrylate, 2-hydroxyethyl methacrylate, 2-hydroxypropyl acrylate and 2-hydroxypropyl methacrylate.

The monomers (b) may be prepared usually by reacting the same unsaturated fatty acids as described with regard to the preparation of the monomers (a) with the hydroxyl group-containing acrylic esters optionally in inert solvents in the presence of esterification catalysts. The reaction is carried out at a temperature of generally about 100° to about 180° C., preferably about 120° to about 160° C., and the reaction time is generally about 0.5 to about 9 hours, usually about 1 to about 6 hours.

The hydroxyl group-containing acrylic ester may be used in a proportion of 0.5 to 1.9 moles, preferably 1.0 to 1.5 moles, per mole of the unsaturated fatty acid.

The esterification catalysts used in the above reaction include, for example, sulfuric acid, aluminum sulfate, potassium hydrogen sulfate, p-toluenesulfonic acid, hydrochloric acid, methyl sulfate and phosphoric acid. The esterification catalyst is used in an amount of usually about 0.001 to about 2.0% by weight, preferably about 0.05 to about 1.0% by weight, based on the total amount of the unsaturated fatty acid and the hydroxyl group-containing acrylic ester to be reacted.

The inert solvents which may be used as required are preferably water-immiscible organic solvents which can be refluxed at a temperature of not more than 180° C. Specific examples are aromatic hydrocarbons such as benzene, toluene and xylene and aliphatic hydrocarbons such as heptane, hexane and octane.

Advantageously, polymerization of the hydroxyl group-containing acrylic ester and/or the resulting fatty acid-modified acrylic ester is inhibited in the above reaction by adding a polymerization inhibitor such as hydroquinone, methoxyphenol, tert-butylcatechol or benzoquinone to the reaction system as required.

In the above reaction, esterification takes place between the hydroxyl group of the hydroxyl group-containing acrylic ester and the carboxylic acid of the unsaturated fatty acid to give an acrylic ester modified with the unsaturated fatty acid.

Ethylenically Unsaturated Carboxylic Acid (a-2)

The ethylenically unsaturated carboxylic acid (a-2) includes unsaturated aliphatic mono- or poly-carboxylic acids having addition-polymerizable double bonds between the carbon atom to which the carboxyl group is bonded and the carbon atom adjacent thereto. Those containing 3 to 8 carbon atoms, particularly 3 to 5 carbon atoms, and 1 or 2 carboxyl groups are particularly suitable. Typical examples are compounds of the following general formula (III)

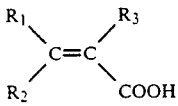

wherein $R_1$ represents a hydrogen atom or a lower alkyl group, $R_2$ represents a hydrogen atom, a lower alkyl group or a carboxyl group, and $R_3$ represents a hydrogen atom, a lower alkyl group or a carboxy-lower alkyl group, and compounds of the general formula (IV)

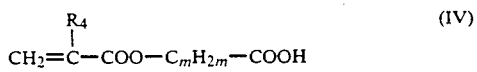

wherein m is an integer of 2–6, and $R_4$ represents a hydrogen atom or a methyl group.

In the above formula (I), the lower alkyl group preferably has not more than 4 carbon atoms, and especially preferably is a methyl group.

Specific examples of such ethylenically unsaturated carboxylic acid include acrylic acid, methacrylic acid, crotonic acid, itaconic acid, maleic acid, maleic anhydride, fumaric acid, 2-carboxyethyl (meth)acrylate, and 2-carboxypropyl (meth)acrylate. They can be used either singly or in combination, and acrylic acid, methacrylic acid, and 2-carboxyethyl (meth)acrylate are particularly preferred.

Other Ethylenically Unsaturated Monomer (a-3)

The ethylenially unsaturated monomers (a-3) other than above (a-1) and (a-2) are not particularly limited, and are selected from a wide range of alpha,beta-ethylenically unsaturated monomers according to the desired properties of the aqueous coating composition of the present invention. Particularly suitable are those having a Q value in Q-e theory of generally at least 0.1, preferably 0.1–5.

The "Q-e theory", as used in the present specification and appended claims, is a theory of the constant of the velocity of addition reaction of a monomer with a radical, which was advocated by T. Alfrey and C. Price in 1947 in order to deal with the radical polymerization or copolymerization of vinyl compounds systematically [see J. Polymer Sci., 2, 101 (1947)]. It expresses the reactivity ratio of monomers in radical polymerization or copolymerization as the function of the resonance stability of the radical and the polar effect of the monomers. The "Q value" represents the degree of the resonance stability, and the "e value" is a measure of a relative charge on the double bond. Generally, styrene is taken as a standard, and is supposed to have a Q value of 1.00 and an e value of −0.80. From the results of copolymerization, the Q and e values of other monomers are determined.

Typical examples of such unsaturated monomers include the following:

(a) Acrylic or Methacrylic Acid Esters $C_1$–$C_{18}$ alkyl esters of acrylic or methacrylic acid, such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate and lauryl methacrylate; glycidyl acrylate and glycidyl methacrylate; $C_2$–$C_8$ alkenyl esters of acrylic or methacrylic acid such as allyl acrylate and allyl methacrylate; $C_2$–$C_8$ hydroxyalkyl esters of acrylic or methacrylic acid, such as hydroxyethyl acrylate, hydroxyethyl methacrylate, hydroxypropyl acrylate ane hydroxypropyl methacrylate; and $C_3$–$C_{18}$ alkenyloxyalkyl esters of acrylic or methacrylic acid, such as allyloxyethyl acrylate and allyloxyethyl methacrylate.

(b) Vinyl Aromatic Compounds

Styrene, alpha-methylstyrene, vinyltoluene, and p-chlorostyrene.

(c) Polyolefin Compounds

Butadiene, isoprene and chloroprene.

(d) Other Unsaturated Monomers

Acrylonitrile, methacrylonitrile, methyl isopropenyl ketone.

These unsaturated monomers can be suitably selected according to the intended properties of the product, and used either singly or in combination.

Of those unsaturated monomers, $C_1$–$C_{18}$ alkyl esters of acrylic and methacrylic acid, and vinyl aromatic compounds are preferred.

To improve curability, water resistance and adhesion, there may be used unsaturated monomers other than the monomers (a) to (d) in an amount of up to about 30 parts by weight per 100 parts by weight of the finally formed copolymer. Examples of such other unsaturated monomers are nitrogen-containing unsaturated monomers such as N-butoxymethyl(meth)acrylamide, N-methylol(meth)acrylamide and vinylpyridine; and phosphorus-containing unsaturated monomers such as dimethyl phosphate-ethyl acrylate and (meth)acryloxyethyl phosphate.

Copolymerization

The copolymer used as component (A-2) in this invention can be obtained by copolymerizing the above fatty acid-modified unsaturated monomer (a-1), ethylenically unsaturated carboxylic acid (a-2) and unsaturated monomer (a-3). The copolymerization can be performed by methods known per se for making acrylic copolymers, for example solution-, emulsion- and suspension-polymerization techniques.

The blending proportions of the above three components in the copolymerization may be varied depending upon the desired properties of the aqueous coating composition, but normally the blending proportions specified below are suitable, provided that the sum of the proportions of the three components is 100 parts by weight.

Fatty acid-modified unsaturated monomer (a-1): 1 to 98 parts by weight, preferably 10 to 85 parts by weight, and above all 15 to 70 parts by weight, for excellent film properties.

Ethylenically unsaturated carboxylic acid (a-2): 0.5 to 50 parts by weight, preferably 1 to 30 parts by weight, above all 2 to 20 parts by weight, for excellent water-solubility and film properties.

Ethylenically unsaturated monomer (a-3): 0 to 95 parts by weight, preferably 5 to 83 parts by weight, above all 7 to 80 parts by weight, for excellent film properties.

Advantageously, the above copolymerization reaction is performed by a solution polymerization technique. Specifically, the above three components in a suitable inert solvent can be reacted in the presence of a polymerization catalyst for about 1 to about 20 hours, preferably about 6 to about 10 hours, and normally at about 0° to about 180° C., preferably at about 40° to about 170° C.

As stated hereinabove, the (semi)drying oil fatty acid-modified vinyl polymer (A-2) may also be produced by first copolymerizing the ethylenically unsaturated carboxylic acid (a-2) and the other alpha,beta-ethylenically unsaturated monomer (a-3), and reacting the resulting copolymer with the glycidyl ester of the (semi)drying oil fatty acid to introduce (semi)drying oil fatty acid residues.

The glycidyl ester of the (semi)drying oil fatty acid includes compounds of the following formula

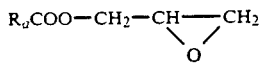

wherein $R_a$ represents a moiety resulting from removing the carboxyl group from a (semi)drying oil fatty acid. Specific examples are a glycidyl ester of soybean oil fatty acid, a glycidyl ester of safflower oil fatty acid and a glycidyl ester of linseed oil fatty acid.

As an alternative, the (semi)drying oil fatty acid-modified vinyl polymer (A-2) may be prepared by first copolymerizing the ethylenically unsaturated carboxylic acid (a-2) and the alpha,beta-ethylenically unsaturated monomer (a-3) having a hydroxyalkyl group, and subjecting the resulting copolymer to an addition reaction with a compound (a-5) having an isocyanate group and a non-conjugated double bond.

The compound (a-5) having an isocyanate group and a non-conjugated double bond may be produced by reacting the (semi)drying oil fatty acid with a 1,2-epoxy compound or a polyhydric alcohol (see, for example, Japanese Laid-Open Patent Publication No. 235466/1986).

The reaction of the epoxy resin (A-1) with (semi)drying oil fatty acid-modified vinyl polymer (A-2) can be carried out by mixing the two and heating the mixture usually at about 50° to 180° C. while the acid value of the reaction product is monitered.

The mixing ratio between the epoxy resin (A-1) and the (semi)drying oil fatty acid-modified vinyl polymer (A-2), as the weight ratio of the solids, is 90/10 to 5/95, preferably 80/20 to 7/93, more preferably 70/30 to 7/93. If the ratio exceeds 90/10, the particles of the resulting dispersion become large, and the product has inferior water dispersibility and storage stability. If it is less than 5/95, the hardness and other properties of a coated film prepared from the resulting coating composition are inferior.

The reaction product (component [A]) may have an acid value of generally about 7 to about 130, preferably about 15 to about 100, more preferably 15 to 90 in view of storage stability and film properties. From the viewpoint of film properties, it may have a number average molecular weight of generally about 500 to about 1,500,000, preferably about 1,000 to about 200,000, more preferably 2,000 to 150,000.

The component [A] (water-solubilized product or water-dispersed product) can be obtained by neutralizing part or the whole of the carboxyl groups in the reaction product with an aqueous solution of a neutralizing agent. The neutralizing agent may, for example, be ammonia, an amine, an alkali metal hydroxide, an alkali metal carbonate or an alkali metal bicarbonate. Examples of the amine are primary, secondary or tertiary lower alkylamines, primary, secondary or tertiary lower alkanolamines, and cycloalkylamines. The term "lower", as used herein, means that a group or a compound so qualified has not more than 6, preferably not more than 4, carbon atoms. Illustrative of the alkali metal hydroxide are potassium hydroxide and sodium hydroxide. The alkali metal carbonate or bicarbonate may, for example, be sodium carbonate and sodium bicarbonate. Triethylamine is particularly preferred as the neutralization agent. Triethylamine is also effective as a reaction catalyst for the components (A-1) and (A-2). Moreover, triethylamine can be one component of a quaternary ammonium salt. The amount of the neutralization agent may generally be within the range of 0.1 to 2.0 equivalents, preferably 0.5 to 1.2 equivalents, based on the carboxyl groups in the reaction product.

The coating composition of this invention can be obtained by mixing the component [A] with the organic solvent [B] and water to dissolve or disperse it.

To increase the smoothness (gloss) of the surface of a coated film, the coating composition of this invention contains the amphoteric organic solvent having affinity for the component [A] and water as component [B]. The amphoteric organic solvent is distributed to the electrodeposited film and serves to impart flowability to it. The component [B] dissolves the component [A] and is miscible with water. If desired, a non-hydrophilic solvent which dissolves the component [A] but is not miscible with water may be used together with the amphoteric organic solvent to further improve the flowability of the coated film. Examples of the amphoteric organic solvent are Cellosolve solvents of the formula $HO-CH_2CH_2-OR_5$ wherein $R_5$ represents an alkyl group having 1 to 8 carbon atoms, such as butyl Cellosolve and ethyl Cellosolve; carbitol solvents of the formula $HO-CH_2CH_2-O-CH_2CH_2-OR_5$ wherein $R_5$ is as defined, such as methyl carbitol and butyl carbitol; glyme solvents of the formula $R_6O-CH_2CH_2-OR_7$ wherein each of $R_6$ and $R_7$ represents an alkyl group having 1 to 3 carbon atoms, such as ethylene glycol dimethyl ether; diglyme solvents of the formula $R_6O-CH_2CH_2OCH_2CH_2-OR_7$ wherein $R_6$ and $R_7$ are as defined, such as diethylene glycol dimethyl ether; Cellosolve acetate solvents of the formula $R_8O-CH_2CH_2OCOCH_3$ wherein $R_8$ represents a hydrogen atom or a methyl or ethyl group, such as ethylene glycol monoacetate and methyl Cellosolve acetate; and alcohols of the formula $R_9OH$ wherein $R_9$ represents an alkyl group having 1 to 4 carbon atoms, such as ethanol, propanol, n-butanol, sec-butanol and isobutanol. Diacetone alcohol, propylene glycol monoethyl ether, dioxane, tetrahydrofuran, acetone, dimethylformamide and 3-methoxy-3-methylbutanol may also be used. Among the above organic solvents, n-butyl Cellosolve, ethyl Cellosolve, butyl carbitol, isopropanol and sec-butanol are especially preferred.

Examples of the non-hydrophilic solvent include aromatic hydrocarbons of the formula

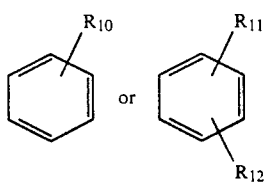

wherein $R_{10}$ represents a hydrogen atom or an alkyl group having 1 to 4 carbon atoms, and $R_{11}$ and $R_{12}$ each represent an alkyl group having 1 to 4 carbon atoms, such as toluene and xylene; acids or esters of the formula $R_{13}-COO-R_{14}$ wherein $R_{13}$ represents an alkyl group having 1 to 6 carbon atoms and $R_{14}$ represents a hydrogen atom, an alkyl group having 1 to 6 carbon atoms, or a cyclohexyl group, such as ethyl formate, butyl acetate, cyclohexyl acetate; ketones of the formula $R_{15}R_{16}C=O$ wherein each of $R_{15}$ and $R_{16}$ represents an alkyl group having 1 to 8 carbon atoms and

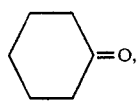

such as methyl ethyl ketone and cyclohexanone; ethers of the formula $R_{15}-O-R_{16}$ wherein $R_{15}$ and $R_{16}$ are as defined, such as ethyl ether and hexyl ether; and alcohols of the formula $R_{17}OH$ wherein $R_{17}$ represents an alkyl group having 5 to 11 carbon atoms, such as hexanol. Among the above non-hydrophilic solvents, butyl acetate, cyclohexanone, hexanol, n-octanol and benzyl alcohol are especially preferred. The amount of the non-hydrophilic solvent used is generally not more than 70% by weight, preferably 5 to 60% by weight, more preferably 10 to 55% by weight, based on the total amount of the two solvents.

The suitable amount of the organic solvent [B] to be added is generally 15 to 500 parts by weight, preferably 30 to 200 parts by weight, especially preferably 50 to 150 parts by weight, per 100 parts by weight as solids of the component [A].

As required, a coloring pigment, an extender pigment, a corrosion inhibiting pigment, and a surfactant may be incorporated in the aqueous coating composition of this invention as is usual in the art.

A metal salt dryer in general use, such as cobalt naphthenate or lead naphthenate, may be added to improve the air drying property of the coated film at room temperature. But since it is likely to reduce the stability of the electrodeposition bath, its amount is preferably selected to meet the required bath stability. Specifically, the amount of the metal salt drying agent is generally 0.001 to 0.1 part, preferably 0.002 to 0.08 part, as the weight of the metal per 100 parts by weight (as solids of the component [A]).

The aqueous coating composition of this invention produced as above can be widely used as an electrodeposition paint. In electrodeposition coating, the electrodeposition coating bath may be obtained by diluting the coating composition with water so that the content of the resin solids (mainly the component [A]) in the composition becomes generally 3 to 25% by weight, preferably 5 to 20% by weight.

An article to be coated may be an article of any size and shape if at least the surface of it is formed of an electrically conductive metal. Since the aqueous coating composition does not require heating to cure the coated film, it can be applied advantageously to articles which have a large heat capacity and are difficult to permit curing of the coated film by heating. Specific examples are articles made of iron, aluminum, and steel, either as such or as surface-treated chemically by known methods (for example, with zinc phosphate or iron phosphate).

The electrodeposition coating may be carried out by known methods. For example, the temperature of the electrodeposition coating bath prepared as above is adjusted to 10° to 50° C., preferably 20° to 35° C., and the article to be coated is immersed in it as an anode. A voltage of 10 to 300 V, preferably 30 to 250 V, is applied across the article and a separately provided cathode for 30 seconds to 20 minutes, preferably 1 to 10 minutes to deposit a coated film on the surface of the article (anode). Then, the article is withdrawn from the electrodeposition coating bath and left to stand at room temperature, whereby the coated film dries and cures. If required, the coated article may be heated to such an extent that the film components do not thermally decompose (less than about 250° C.).

The following Examples and Comparative Examples illustrate the present invention more specifically. In the following examples, all parts and percentages are by weight.

Preparation of Epoxy Resin [A-1]

Epikote 1007 (epoxy equivalent 1750-2200; number average molecular weight 2900) and Epikote 1009 (epoxy equivalent 2400-3300; number average molecular weight 3750) were each dissolved in n-butyl Cellosolve to form 70% solutions designated as [A-1-①] and [A-1-②].

Preparation of (Semi)Drying Oil Fatty Acid-Modified Vinyl Polymer [A-2]

| [A-2-①] | |
|---|---|
| Safflower oil fatty acid | 236 parts |
| Glycidyl methacrylate | 119 parts |
| Hydroquinone | 0.4 part |
| Tetraethyl ammonium bromide | 0.2 part |

The above ingredients were placed in a reaction vessel, and reacted with stirring at 140° to 150° C. to obtain an addition-reaction product. The addition-reaction between the epoxy group and the carboxyl group was monitored while measuring the amount of the remaining carboxyl group. A period of about 4 hours was required until the reaction came to completion.

Then, 1150 parts of n-butyl Cellosolve was put in another reaction vessel, and heated to 120° C. A mixture of the following formulation was added dropwise over the course of about 2 hours, and reacted while introducing nitrogen.

| The fatty acid-modified monomer obtained above | 692 parts |
|---|---|
| Styrene | 957 parts |
| n-Butyl methacrylate | 357 parts |
| 2-Ethylhexyl methacrylate | 115 parts |
| Acrylic acid | 175 parts |
| Azobisdimethylvaleronitrile | 74 parts |

The reaction temperature was maintained at 120° C., and the above mixture was added dropwise while stirring the reaction solution. One hour after the addition, 16 parts of azobisisobutyronitrile was added to the reaction solution, and 2 hours later, 16 parts of azobisisobutyronitrile was further added to the reaction solution. Then, the reaction mixture was maintained at 120° C. for 2 hours. After the reaction, the unreacted monomers and n-butyl Cellosolve were removed by distillation under reduced pressure to adjust the non-volatile content to 76.4%. As a result, a copolymer having a resin acid value of 55.5 and a Gardner viscosity (60% n-butyl Cellosolve solution; the same meaning hereinafter) of Z4 was obtained.

| [A-2-②] | |
|---|---|
| Soybean oil fatty acid | 2240 parts |
| Hydroquinone | 1.3 parts |
| Methyl sulfate | 2.6 parts |
| n-Heptane | 144 parts |

The above ingredients were placed in a reaction vessel, and with stirring, the mixture was heated to 150° C. A mixture of the following ingredients,

| 2-hydroxyethyl methacrylate | 1300 parts |
|---|---|
| hydroquinone | 2.6 parts |
| methyl sulfate | 7.6 parts |
| toluene | 234 parts | was added dropwise to the reaction vessel at 150° C. over the course of 2 hours. The resulting water of condensation was removed from the reaction system, and the reaction was carried out at 150° C. for 6.5 hours until the acid value of the reaction product reached 7.4. When the acid value of the reaction product reached 7.4, the pressure inside of the reaction vessel was reduced, and the reaction mixture was distilled under reduced pressure to remove the solvent until the proportion of the heat residue became 95%. A fatty acid-modified monomer having a Gardner viscosity of F to G was obtained.

Then, 1150 parts of n-butyl Cellosolve was put in another reaction vessel, and heated to 120° C. A mixture of the following ingredients was added dropwise over 2 hours, and the reaction was carried out while introducing nitrogen.

| The above fatty acid-modified monomer | 692 parts |
|---|---|
| Styrene | 898 parts |
| n-Butyl methacrylate | 336 parts |
| Lauryl methacrylate | 115 parts |
| Acrylic acid | 255 parts |
| Azobisdimethylvaleronitrile | 92 parts |

The reaction temperature was maintained at 120° C., and while stirring the reaction solution, the above mixture was added dropwise. One hour after the addition, 23 parts of azobisisobutyronitrile was added to the reaction solution, and further two hours later, 11.5 parts of azobisisobutyronitrile was added to the reaction solution. The reaction mixture was then maintained at 120° C. for 2 hours. After the reaction, the unreacted monomer and n-butyl Cellosolve were removed by distillation under reduced pressure until the non-volatile content became 75%. There was obtained a copolymer having a resin acid value of 83.8 and a Gardner viscosity of Z4.

[A-2-③]

n-Butyl Cellosolve (1200 parts) was put in a reaction vessel, and heated to 120° C. A mixture of the following formulation was added dropwise for about 2 hours. The reaction was carried out while introducing nitrogen.

| Methacrylic acid | 155 parts |
|---|---|
| Styrene | 898 parts |
| 2-Ethylhexyl acrylate | 336 parts |
| n-Butyl methacrylate | 115 parts |
| Acrylic acid | 256 parts |

The reaction temperature was maintained at 120° C., and while the reaction solution was stirred, the above mixture was added dropwise. Thirty minutes after the addition, 20 parts of azobisisobutyronitrile was added to the reaction solution. Further, 1.5 hours later, 10 parts of azobisisobutyronitrile was added. The reaction mixture was maintained at 120° C. for 2 hours, and 537 parts of a glycidyl ester of unsaturated fatty acid (CR-G, a tradename for a product of Okamura Seiyu Co., Ltd.) and 1.0 part of tetraethyl ammonium bromide were added. The mixture was heated at 140° C. and reacted for 3.5 hours until the product had a resin acid value of 0.6. The unreacted monomer and n-butyl Cellosolve were removed by distillation under reduced pressure until the non-volatile content became 76.1%. There was obtained a copolymer having a resin acid value of 81.3 and a Gardner viscosity of Z3.

EXAMPLE 1

A reaction vessel was charged with 288 parts of Epikote 1007 solution ([A-1-①], 262 parts of the modified vinyl polymer [A-2-①] and 20 parts of triethylamine (1.0 equivalent based on the carboxyl group), and they were reacted at 90° C. for 1 hour until a resin having an acid value of 16.7 was obtained. Then, the product was cooled to about 50° C., and water was added to obtain an aqueous solution of component [A] having a non-volatile content of 25.9%.

Thirty parts of Titanium Dioxide JR-600 (a tradename for rutile-type titanium dioxide made by Teikoku Kako Co., Ltd.) was added to the neutralized solution (per 100 parts of the solids of component [A]). The mixture was dispersed by a paint conditioner, 40 parts of n-butyl Cellosolve was added per 100 parts by weight of the solids of the component [A]. An organic solvent as indicated in Table 1 was added and the mixture was diluted with deionized water so that the total content of the resin and the pigment became 10%. As a result, an aqueous coating composition for electrodeposition coating was prepared.

Electrodeposition Coating

The aqueous coating composition was put in a four-liter hard polyvinyl chloride vessel capable of being stirred by a magnetic stirrer, and degreased and polished steel sheet (SPCC JIS-G3141), 75×50×0.8 mm, were used as an anode and a cathode. A dc voltage was applied across the two electrodes by a rectifier (TYPE G-25M GP0250-5, made by Takasago Seisakusho) for 2 minutes. The distance between the electrodes was adjusted to 15 cm. The two electrodes were immersed to a depth of 10 cm in the bath. After applying a voltage of 150 V for 2 minutes, the mild steel sheet as the anode was taken out of the bath and suspended vertically to allow it to dry at room temperature. The stability of the coating composition in the electrodeposition coating bath and the properties of the resulting coated film were measured, and the results are summarized in Table 1.

EXAMPLES 2-5 AND COMPARATIVE EXAMPLES 1-2

In each run, an aqueous coating composition was prepared in accordance with the recipe shown in Table 1 by the same procedure as in Example 1 and the same pigment as in Example 1 was dispersed in it. Using the resulting coating composition, electrodeposition coating was carried out under the same conditions as in Example 1.

The results are shown in Table 1.

was determined from the difference in the weight of the coated film before and after the refluxing.

(*2): Antiblocking property

Two test pieces were baked at 80° C. for 10 minutes, and then laid one on top of the other. A gauze was placed on the upper test piece and a weight of 500 g was placed on it. The test pieces were then left to stand for 48 hours in a constant-temperature chamber at 50° C.

(*3): Stability by stirring in the open state

Two liters of the prepared electrodeposition coating composition was put in a 3-liter wide-mouthed bottle and was kept stirred in the open state at 30° C. The state of dissolution or dispersion was periodically observed. When there was no change in appearance, the coating composition was applied by electrodeposition coating.

TABLE 1

|  |  |  | Example 1 | Example 2 | Example 3 | Example 4 | Example 5 | Comparative Example 1 | Comparative Example 2 |
|---|---|---|---|---|---|---|---|---|---|
| Composition of resin in [A] | A-1 | A-1-① | 288 | 144 | 107 |  | 288 |  | 288 |
|  |  | A-1-② |  |  |  | 288 |  |  |  |
|  | A-2 | A-2-① | 262 | 262 | 393 |  |  | 262 | 262 |
|  |  | A-2-② |  |  |  | 260 |  |  |  |
|  |  | A-2-③ |  |  |  |  | 262 |  |  |
| Triethylamine |  |  | 20 | 21 | 31 | 27 | 28 | 20 | 20 |
| Reaction time (90° C.) (hours) |  |  | 1.0 | 1.0 | 1.5 | 1.0 | 1.5 |  | Only mixing |
| Acid value | Before reaction |  | 27.6 | 37.0 | 44.1 | 38.4 | 40.6 |  | 27.6 |
| of the resin in [A] | After reaction |  | 16.7 | 30.5 | 36.8 | 29.8 | 30.8 |  | 27.6 |
| Number average molecular weight |  |  | 20000 | 15000 | 30000 | 25000 | 30000 | 8000 | — |
| Water |  |  | 4349 | 3249 | 4040 | 4271 | 4341 | 2158 | 4349 |
| [B] n-butyl Cellosolve |  |  | 12 | 15 | 34 | 16 | 12 | 18 | 12 |
| Organic solvent [B] | n-Octanol |  | 160 |  |  | 160 | 80 | 80 |  |
|  | Benzyl alcohol |  |  | 120 |  |  | 80 |  |  |
|  | iso-Propanol |  |  |  | 153 |  |  |  | 160 |

TABLE 2

|  |  |  | Example |  |  |  |  | Comparative Example |  |
|---|---|---|---|---|---|---|---|---|---|
|  |  |  | 1 | 2 | 3 | 4 | 5 | 1 | 2 |
| Properties of the coated film | State of the coated film |  | Good | Good | Good | Good | Good | Good | Poor |
|  | Thickness (on drying) (μ) |  | 23 | 22 | 24 | 22 | 24 | 24 | 10 |
|  | Drying property (20° C.) | Finger touch (minutes) | 30 | 25 | 35 | 25 | 20 | 50 | 100 |
|  |  | Curing time (hours) | 2 | 2 | 2.5 | 2 | 1.5 | 4 | 20 |
|  | Gel fraction (20° C.)(*1) | After drying for 2 hours | 4 | 5 | 10 | 8 | 11 | 2 | 1 |
|  |  | After drying for 24 hours | 8 | 10 | 20 | 18 | 23 | 4 | 1 |
|  |  | After drying for 72 hours | 20 | 30 | 42 | 37 | 44 | 15 | 2 |
|  |  | After drying for 7 days | 40 | 62 | 55 | 65 | 67 | 17 | 3 |
|  | Hardness (20° C.) | After drying for 3 hours | 2B | 3B | 3B | 2B | 2B | 5B | — |
|  |  | After drying for 12 hours | B | B | B | F | B | 3B | — |
|  |  | After drying for 24 hours | H | HB | HB | H | HB | 2B | 7B |
|  | Antiblocking property(*2) |  | Good | Good | Good | Good | Good | Poor | Poor |
| Stability by stirring in the open state(*3) |  |  | No change for 8 weeks | No change for 8 weeks | No change for 8 weeks | No change for 8 weeks | No change for 8 weeks | After 8 weeks, there was flocculated matter |  |

Note to Table 2
(*1)Gel fraction
The coated film was immersed in methyl ethyl ketone solution and refluxed for 2 hours. The uncured product was extracted from the coated film, and the gel fraction was determined from the difference in the weight of the coated film before and after the refluxing.
(*2)Antiblocking property
Two test pieces were baked at 80° C. for 10 minutes, and then laid one on top of the other. A gauze was placed on the upper test piece and a weight of 500 g was placed on it. The test pieces were then left to stand for 48 hours in a constant-temperature chamber at 50° C.
(*3)Stability by stirring in the open state
Two liters of the prepared electrodeposition coating composition was put in a 3-liter wide-mouthed bottle and was kept stirred in the open state at 30° C. The state of dissolution or dispersion was periodically observed. When there was no change in appearance, the coating composition was applied by electrodeposition coating. The coated film was examined for changes in the state of the coated film, the film thickness, throwing power and the reduction of breakdown voltage.

Note to Table 2

(*1): Gel fraction

The coated film was immersed in methyl ethyl ketone solution and refluxed for 2 hours. The uncured product was extracted from the coated film, and the gel fraction was determined from the difference in the weight of the coated film before and after the refluxing.

The coated film was examined for changes in the state of the coated film, the film thickness, throwing power and the reduction of breakdown voltage.

What we claim is:

1. An air-drying aqueous coating composition for electrodeposition comprising

[A] a water-solubilized product or a water-dispersed product obtained by reacting
  (A-1) an epoxy resin having a number average molecular weight of at least about 350 and an epoxy equivalent of about 140 to about 10,000 and selected from bisphenol A-epichlorohydrin epoxy resins and bisphenol F-epichlorohydrin epoxy resins, and
  (A-2) a (semi)drying oil fatty acid-modified vinyl polymer having an acid value of 10 to 200 and obtained by copolymerizing
    (a-1) a (semi)drying oil fatty acid-modified unsaturated monomer which is selected from the group consisting of (a) monomers obtained by reacting oxirane group-containing unsaturated monomers with (semi)drying oil fatty acids;
    (b) monomer obtained by reacting hydroxy group-containing unsaturated monomers with (semi)drying oil fatty acids;
    (c) monomers obtained by the addition of isocyanate compounds to the monomers (a-1); and
    (d) monomers obtained by reacting monomers (a-1) with organic acids, organic acid anhydrides or organic acid chlorides; the said (semi)drying oil fatty acid being selected from the group consisting of safflower oil fatty acid, linseed oil fatty acid, soybean oil fatty acid, sesame oil fatty acid, poppy oil fatty acid, perilla oil fatty acid, hemp seed oil fatty acid, grape kernel oil fatty acid, corn oil fatty acid, tall oil fatty acid, sunflower oil fatty acid, cotton seed fatty acid, walnut oil fatty acid and rubberseed oil fatty acid,
    (a-2) an ethylenically unsaturated carboxylic acid, and
    (a-3) an alpha,beta-ethylenically unsaturated monomer;
or by first copolymerizing components (a-2) and (a-3) and reacting the resulting polymer with (a-4) a glycidyl ester of the (semi)drying oil fatty acid of the formula

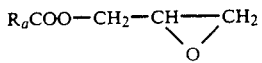

wherein $R_a$ represents a moiety resulting from removing the carboxyl group from a (semi)drying oil fatty acid as previously defined, in such proportions that the solids weight ratio of the component (A-1) to the component (A-2) is from 90/10 to 5/95, and neutralizing the reaction product of the components (A-1) and (A-2) having an acid value of about 7 to about 130 with a neutralizing agent; and

[B] an amphoteric organic solvent having affinity for component [A].

2. The composition of claim 1 wherein the epoxy resin (A-1) is represented by the following formula:

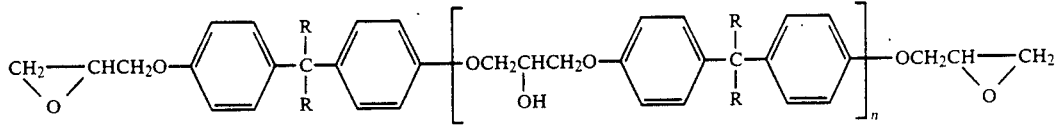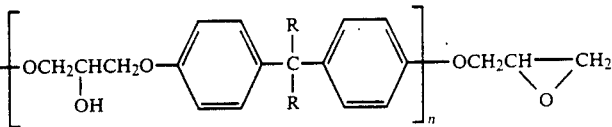

wherein R represents a hydrogen atom or a methyl group and n is 0 to 27.

3. The composition of claim 1 wherein the epoxy resin (A-1) has a number average molecular weight of about 350 to about 10,000 and an epoxy equivalent of about 180 to about 8,000.

4. The composition of claim 1 wherein the (semi)drying oil fatty acid-modified vinyl polymer (A-2) has a glass transition temperature of −30° to 60° C.

5. The composition of claim 1 wherein the (semi)drying oil fatty-modified vinyl polymer (A-2) has a fatty acid content of 5 to 60% by weight and an acid value of 10 to 200.

6. The composition of claim 1 wherein the (semi)drying oil fatty acid is selected from safflower oil fatty acid, linseed oil fatty acid, soybean oil fatty acid and tall oil fatty acid.

7. The composition of claim 1 wherein the weight ratio of the solids content of the epoxy resin (A-1) to the solids content of the (semi)drying oil fatty acid-modified vinyl polymer (A-2) is from 80/20 to 7/93.

8. The composition of claim 1 wherein the component [A] has a number average molecular weight of about 500 to about 1,500,000.

9. The composition of claim 1 wherein the amphoteric organic solvent [B] contains a non-hydrophilic solvent.

10. The composition of claim 9 wherein the non-hydrophilic solvent is selected from aromatic hydrocarbons, acids, esters, ketones, ethers and alcohols.

11. The composition of claim 10 wherein the non-hydrophilic solvent is selected from butyl acetate, cyclohexane, hexanol, n-octanol and benzyl alcohol.

12. The composition of claim 9 wherein the content of the non-hydrophilic solvent is not more than 70% by weight.

13. The composition of claim 1 which comprises 100 parts (as solids) of the water-solubilized product or water-dispersed product [A] and 15 to 500 parts by weight of the amphoteric organic solvent [B].

14. An article coated with the composition of claim 1.

15. The composition of claim 1 wherein the amphoteric organic solvent [B] is selected from ethylene glycol monoalkyl ether solvents, diethylene glycol monoalkyl ether solvents, ethylene glycol dialkyl ether solvents, diethylene glycol dialkyl ether solvents, acetates of ethylene glycol monoalkyl ether solvents and alcohol solvents.

16. The composition of claim 15 wherein the amphoteric organic solvent [B] is selected from ethylene glycol mono-n-butyl ether, ethylene glycol monoethyl ether, diethylene glycol mono-n-butyl ether, isopropanol and sec-butanol.